United States Patent [19]
Vansteelant et al.

[11] Patent Number: 4,765,237
[45] Date of Patent: Aug. 23, 1988

[54] ROUND BALER WITH EXPANDABLE BALE CHAMBER

[75] Inventors: Marc G. Vansteelant; Adrianus Naaktgeboren, both of Zedelgem, Belgium; Shaun A. Seymour, New Holland, Pa.

[73] Assignee: Ford New Holland, Inc., New Holland, Pa.

[21] Appl. No.: 111,379

[22] Filed: Oct. 20, 1987

[30] Foreign Application Priority Data

Oct. 21, 1986 [EP] European Pat. Off. ........ 86201829.8

[51] Int. Cl.$^4$ .............................................. B30B 3/04
[52] U.S. Cl. ....................................... 100/89; 56/341
[58] Field of Search ...................... 100/88, 89; 56/341, 56/342, 343, 344

[56] References Cited

U.S. PATENT DOCUMENTS

| | | |
|---|---|---|
| 4,288,971 | 9/1981 | McClure ................................ 56/341 |
| 4,566,379 | 1/1986 | Decoene et al. ....................... 100/89 |
| 4,698,955 | 10/1987 | Wagstaff ............................... 100/88 |

FOREIGN PATENT DOCUMENTS

| | | |
|---|---|---|
| 2626263 | 4/1983 | Fed. Rep. of Germany . |
| 2278241 | 2/1976 | France . |
| 2558031 | 7/1985 | France . |
| 2090560 | 7/1982 | United Kingdom . |
| 2150492 | 11/1984 | United Kingdom . |

Primary Examiner—Peter Feldman
Attorney, Agent, or Firm—Darrell F. Marquette; Frank A. Seemar; Larry W. Miller

[57] ABSTRACT

A round baler is provided which comprises a bale chamber which is expandable between a bale start position and a full bale position and which comprises a first of bale-forming means disposed generally circumferentially around a portion of the full size bale chamber when the baler is in its bale-forming condition, and a second bale-forming means which is movable relative to the first bale-forming means between two extreme positions. The second bale-forming means is cooperable, in one extreme position, with part of the first bale-forming means to form the bale start chamber of reduced dimensions for starting bale formation, and, in the other extreme position, with the first bale-forming means to define a generally cylindrical bale chamber generally corresponding to a full size bale. The first and second bale-forming means are cooperable to form a round bale of crop material during movement of the second bale-forming means from the one extreme position towards the other extreme position. The second bale-forming means is formed from at least two portions which also are movable relative to each other such that, in partially defining the bale-start chamber, the portions of the second bale-forming means are inclined relative to each other at an angle which is smaller than the angle therebetween when the second bale-forming means partially defines the full size bale chamber.

16 Claims, 5 Drawing Sheets

FIG_3

ROUND BALER WITH EXPANDABLE BALE CHAMBER

BACKGROUND OF THE INVENTION

This invention relates to roll baling machines which form cylindrical rolls of crop material and which are commonly referred to as round balers.

In U.S. Pat. No. 4,566,379, there is disclosed a round baler having two sets of bale-forming means which define a bale-forming chamber which is expandable from a small start chamber to a full size chamber. In order to provide the expandable bale-forming chamber, one set of bale-forming means is movable with respect to the other set but it has been found that with some crops and/or crop conditions, this is insufficient to ensure that the core of a bale being formed is properly constituted and that the bale is continually rotated during formation. It is highly desirable that the core of a bale being formed has the correct density. It is furthermore essential to ensure that a bale being formed undergoes continual rotation in order that crop material being fed into the machine is taken in and added to the bale. If bale rotation ceases, then further crop material cannot be added to the bale which thus results in the baler becoming blocked.

It is an object of the present invention to overcome the shortcomings of this known machine while taking advantage of the basically satisfactory general tvoe of bale-forming means employed therein.

SUMMARY OF THE INVENTION

According to the present invention there is provided a round baler with a bale chamber expandable between a bale start position and a full bale position and comprising a first bale-forming means disposed generally circumferentially around a portion of the full size bale chamber when the baler is in its bale-forming condition, and a second bale-forming means, which is movable relative to the first bale-forming means between two extreme positions; said second bale-forming means being cooperable, in one extreme position, with part of the first bale forming means to form the bale start chamber of reduced dimensions for starting bale formation, and, in the other extreme position, with all of the first bale-forming means to define a generally cylindrical bale chamber generally corresponding to a full size bale and said first and second bale-forming means being cooperable to form a round bale of crop material during movement of the second bale-forming means from the one extreme position towards the other extreme position. This baler has an improvement in that the second bale-forming means has at least two portions which are movable relative to each other such that, in partially defining the bale-start chamber, the portions of the second bale-forming means are inclined relative to each other at an angle which is smaller than the angle therebetween when the second bale-forming means partially defines the full size bale chamber.

The two portions of the second bale-forming means may be pivotal about a common axis with one portion further also being pivotal relative to the other portion such that said angle between the two portions increases as the bale chamber increases in size during bale formation. The two portions of the second bale-forming means may be interconnected by means operable to effect said relative movement between the two portions and in a preferred embodiment, the interconnecting means may comprise a linkage mechanism having a first link pivotally connected at one end to one portion of the second bale-forming means, a bell crank lever pivotally mounted intermediate its ends on the other portion of the second bale-forming means and pivotally connected at one of its ends to the first link, and a second link pivotally attached at one end to the bell crank lever, at the other end thereof and pivotally connected at its other end to the body of the baler such that the angular displacement of the one portion relative to the other portion is induced by the angular displacement of the other portion around the common pivot axis.

Alternatively, the means interconnecting the two portions of the second bale-forming means comprises a rod pivotally connected to the respective portions and being slidable with respect to one of these pivots, and a spring acting between an abutment at a fixed position relative to the rod and a further abutment associated with the pivot with respect to which the rod is slidable such that the spring urges the portions to adapt their relative positions defining the smallest included angle therebetween.

Preferably, the two portions of the second bale-forming means have their movement about said common axis controlled by a hydraulic actuator which may interact with the linkage mechanism interconnecting the two portions of the second bale-forming means. The hydraulic actuator mav be connected to a closed hydraulic circuit comprising a pressure relief valve connected between the ends of the cylinder of the actuator and which is operable to determine the resistance to movement of the second bale-forming means about said common axis. Preferably, the pressure relief valve is adjustable in order to vary said resistance to movement and in turn to vary the density of the bale being formed in use of the baler. A non-return valve and a restrictor are connected in series with each other and in parallel with the pressure relief valve; the restrictor and the non-return valve being operable to control the operation of the actuator in one direction and the pressure relief valve being operable to control the operation of the actuator in the other direction.

Movement of the second bale-forming means relative to the first bale forming means as in use of the baler a bale is being formed, is preferably effected by the force applied by said bale being formed on the second bale-forming means; this movement effecting contraction of the hydraulic actuator and the second bale-forming means returning under gravity to their relative position in which they partially define the start chamber once a formed bale has been discharged from the baler.

DESCRIPTION OF THE DRAWINGS

Round balers in accordance with the present invention will now be described in greater detail, by way of example, with reference to the accompanying drawings, in which.

DESCRIPTION OF THE PREFERRED EMBODIMENT

The terms "forward", "rearward", "left" and "right" used in connection with the baler and/or components thereof are determined with reference to the direction of forward operative travel of the baler and should not be considered as limiting. Also the terms "upper" and "lower" are used principally throughout this specification for convenience and it should be understood that these terms equally are not intended to be limiting.

Figure 1:
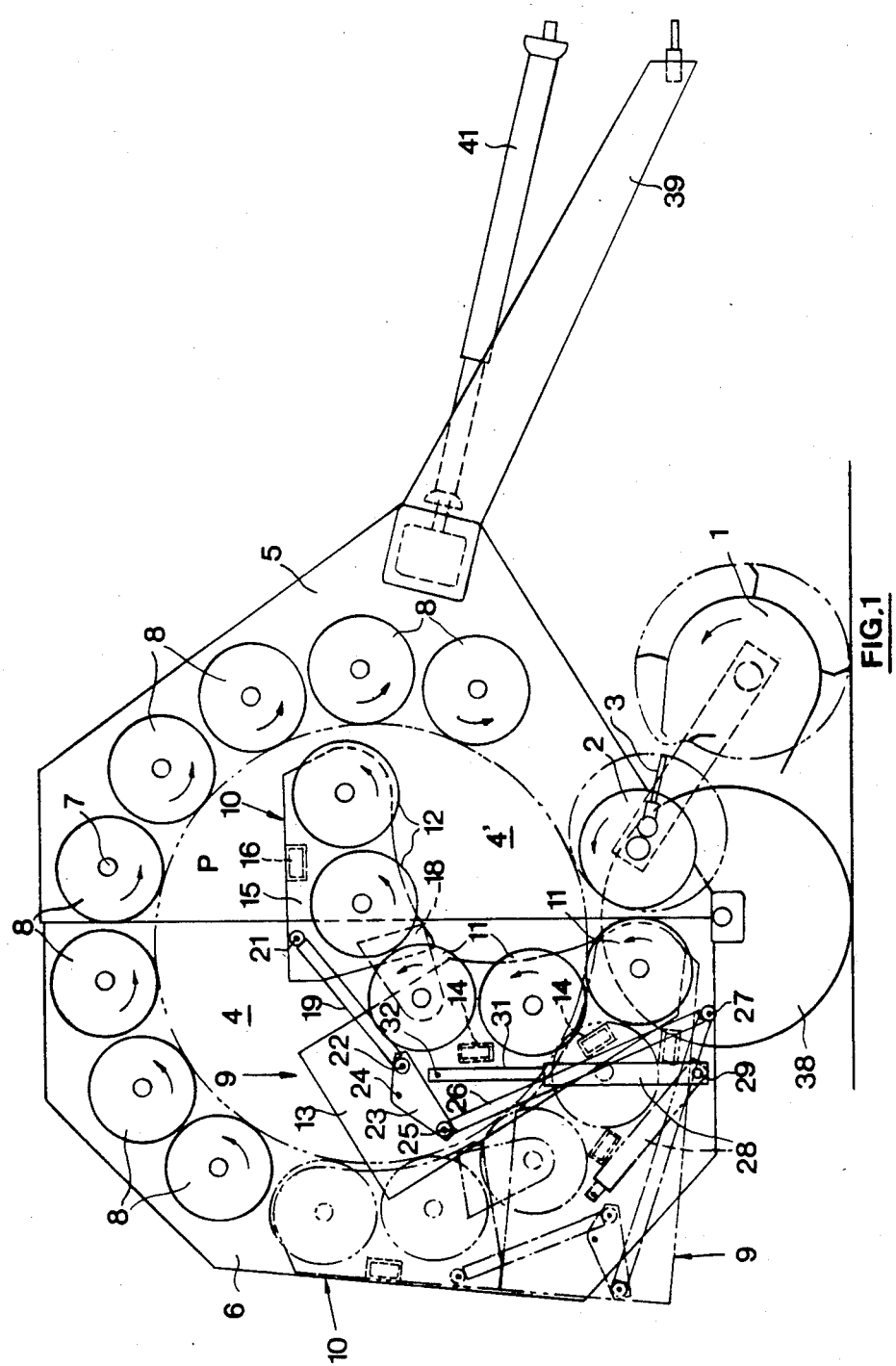
FIG. 1 is a somewhat diagrammatic side view of a first embodiment showing movable bale-forming means in two extreme positions.
Figure 2:
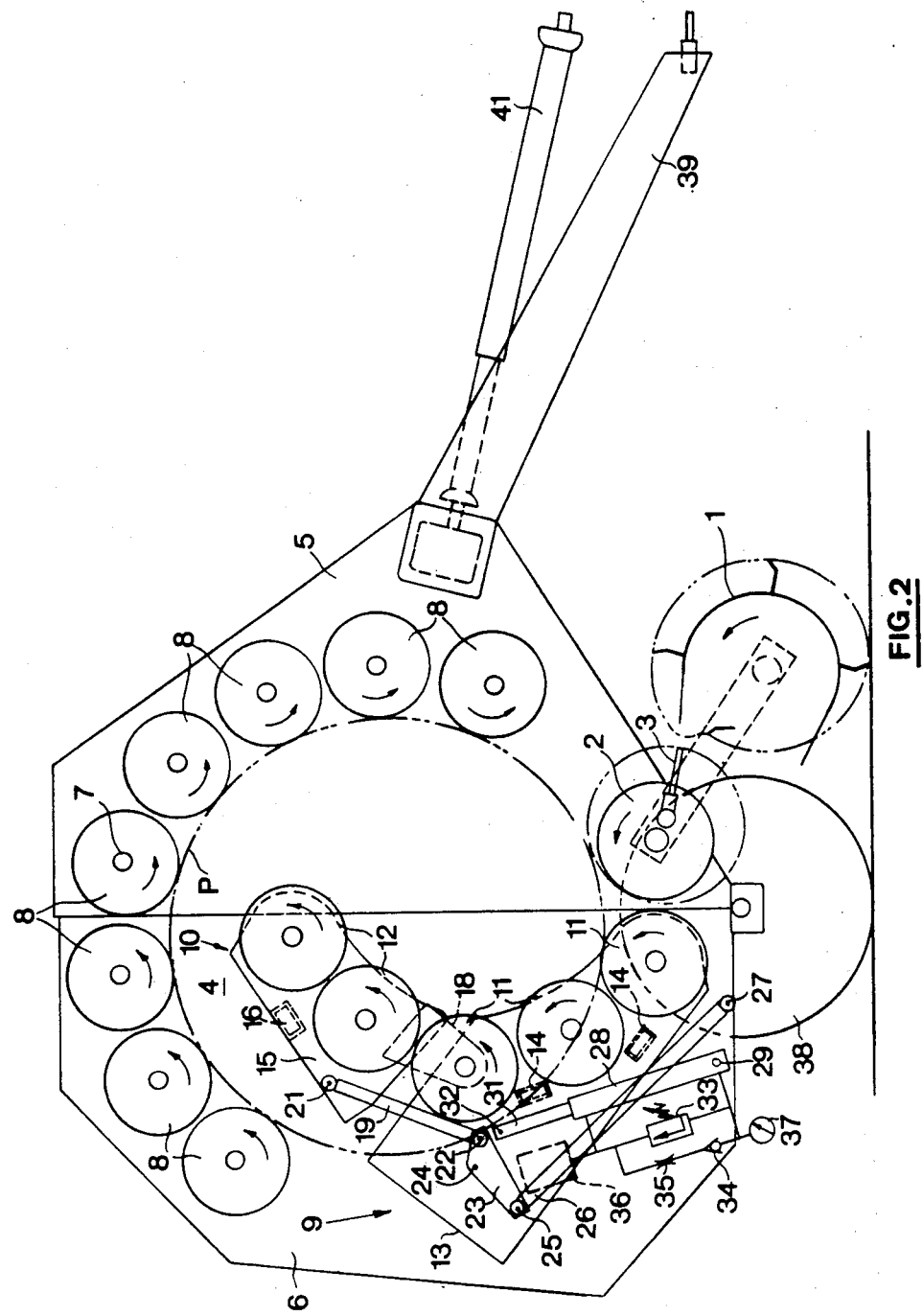
FIG. 2 is a view similar to that of FIG. 1, but showing said movable bale-forming means in an intermediate position.

Referring first to FIGS. 1 and 2, the baler is generally conventional in that it comprises a crop pick-up mechanism or device 1 which is operable; when the machine is pulled across a field with crop material, to pick up said crop material from the ground and transfer it to the bale-forming chamber 4 of the baler over a bale support and feed roll 2 with retractable feed tines 3. The bale chamber 4 is made up of a main frame or front portion 5 and a rear or tailgate portion 6 which is mounted for pivotal movement about a pivot 7 on the main frame 5. The pivot 7 extends co-axially with a top roller 8 on the main frame 5 and which forms part of a first and fixed set of rollers 8 spanning both the front and tailgate chamber portions 5 and 6 and disposed generally around a portion of the periphery of a fully formed bale indicated at P. The rollers 8 form a first bale-forming means, with five of the rollers being disposed in the chamber front portion 5 and three of the rollers in the tailgate portion 6.

A second bale-forming means is provided in the form of two relatively movable portions 9 and 10 with portion 9 having three rollers 11 and portion 10 having two rollers 12. The rollers 11,12 are movable with respect to the rollers 8. The rollers 11 are mounted between opposed sidewalls 13 which are interconnected by a pair of transverse beams 14 so as to provide a rigid rectangular framework. The rollers 12 are also mounted between opposed sidewalls 15 interconnected by a transverse beam 16, again to provide a rigid framework.

The portion 10 with the rollers 12 is pivotally mounted with respect to the rollers 11 about a pivot axis which coincides with the axis of rotation of the uppermost roller 11 on the portion 9. The frameworks of the two sets of rollers are interconnected by a lug 18 at each side of the machine. The lugs 18 pivot at one end around the shaft of said uppermost roller 11 and are attached to the respective sidewalls 15 at the other end. The rollers 11, 12 are also pivotal relative to the rest of the machine about the axis of rotation of the lowermost roller 11 and are further interconnected, at each side of the machine, by a linkage mechanism comprising a link 19 pivotally attached at one end by a pivot 21 to the associated sidewall 15 and pivotally attached at the other end by a pivot 22 to one end of an associated bell crank lever 23. Alternative pivot points (not shown) for the pivots 22 slightly displaced from the one shown may be provided in order to vary the shape of the start chamber 4'. Each bell crank lever is in the form of a plate 23 pivotally attached at 24 to the associated sidewall 13 and with its effective and respective arms pivotally attached at 25 to one end of a further link 26 and, as already mentioned, at 22 to one end of a link 19. The other end of each link 26 is pivotally attached at 27 to the framework of the tailgate portion 6 of the baler.

A hydraulic actuator is disposed at one side of the baler and has the cylinder 28 thereof pivotally attached at 29 to the framework of the tailgate portion 6 and the piston rod 31 thereof pivotally attached at 32 to the associated sidewall 13 of the lower movable portion 9. The hydraulic circuitry associated with the actuator 28, 31 is illustrated in FIG. 2 where it can conveniently be shown, and comprises an adjustable relief valve 33 connected across the ends of the cylinder 28. In parallel with the relief valve 33 there is connected, in series with each other, a non-return valve 34 and a fixed restrictor 35, with the common ends of the restrictor 35 and the relief valve 33 being connected to a tank or reservoir 36. The hydraulic circuit is a closed system and a pressure gauge 37 is connected to the common junction of the non-return valve 34 and the relief valve 33.

Instead of providing the single hydraulic actuator 28, 31 at one side of the lower movable portion 9 and the tailgate 6, it also may be provided generally centrally thereof between transverse beams forming part of respectively the tailgate framework and the framework of the lower movable portion 9 carrying the rollers 11. Alternatively a pair of such hydraulic actuators 28, 31 may be provided, one at each side, in master and slave relationship.

The rollers 11,12 are shown in FIG. 1 in full lines in the position adopted at the start of a bale-forming operation so as to define an almost circular (as seen in end view) start chamber 4', and in broken lines in the position adopted when a full size bale P has been formed. FIG. 2 shows the rollers 11,12 in an intermediate position, i.e. a position adopted when the start chamber 4' has been expanded but is not yet full size. It will be seen from FIGS. 1 and 2 that, as the rollers 11,12 move relative to the of the rollers 8 to expand the start chamber 4', there also is relative movement between the rollers 11 and 12 such that the included angle between the two lines joining, on the one hand, the center of the roller 11 coinciding with the pivotal mounting of the portion 10 on the portion 9 and, on the other hand, the respective centers of the adjacent rollers 11 and 12 on respectively the lower and upper portions 9 and 10, increases.

The baler is provided with a pair of ground-engaging wheels 38 and a tongue 39 by which the machine is towed by a tractor or other vehicle. The moving components of the baler are driven from the towing vehicle via a conventional power take-off shaft 41.

During operation of the baler and to commence formation of a bale, the tailgate 6 is closed and the bale-forming rollers 11,12 are in the full-line position of FIG. 1 (i.e. with the actuator 28, 31 extended) so as to define the start chamber 4' of an almost circular cross-section as already described. Conventional drive means (not shown) drive the rollers 8, 11 and 12 in the anti clockwise direction as seen in the drawings and as indicated by arrows shown in said drawings. The baler is then pulled across a field of cut crop material which is acted upon by the pick-up mechanism 1 and fed to the throat of the start chamber 4' over the feed roller 2. The crop material is then passed to the lowermost roller 11 and is moved around the start chamber 4' coming into contact subsequently with the rollers 12, the last one of which throws the crop material onto the two lowermost rollers 8 which are rotating in a direction (as shown in the drawings by the arrows on the rollers) such as to move the crop material back downwardly, thus completing the rotational or coiling motion of the crop material. It is found that this particular arrangement of the start chamber 4' gives an extremely good core formation with consistent density of the desired magnitude. Furthermore, the core is rotated continuously which is not always the case with known balers, as already mentioned, and whereby blockage of the machine, caused by core stalling, is avoided.

The rollers 8, 11 and 12 which define the start chamber 4', offer a resistance to the expansion of the core as further crop material is added thereto, thus ensuring a required density of that core which is selected by adjusting the throttling action of the relief valve 33. As still further crop material is fed to the bale chamber 4', the rollers 11 and 12 eventually move in an anticlockwise direction, as seen in FIG. 1, while still maintaining the resistance required to provide a good bale density. This movement allows the bale being formed in the bale chamber to gradually increase in size as further material is rolled in a spiral pattern on the core. This anticlockwise movement of the second bale-forming means 9, 10 arises from the fact that the force exerted thereon as the bale increases in size, urges the actuator 28, 31 to gradually contract, thus moving the two portions about the axis of the lowermost roller 11.

Because of the linkage connection 19, 23, 26 between the two portions 9 and 10 and the tailgate framework 6, the portion 10 not only moves about the axis of the lowermost roller 11 but also about the axis of the uppermost roller 11, whereby said portion 10 overall rotates through a greater angle than the other portion 9. This extra movement of the portion 10 comes about by the link 26 being coupled to the tailgate framework 6 by the pivot 27 whereby the bell crank lever 23 is caused to rotate clockwise around its pivotal mounting 24 on the associated sidewall 13, as seen in FIG. 1, as soon as the portion 9 begins to rotate in the anticlockwise direction. This clockwise rotation of the bell crank lever 23 pulls the link 19 which in turn pivots the portion 10 about the axis of the uppermost roller 11. As the size of the bale further increases, the bale chamber also expands further and eventually attains its full size 4, i.e. the rollers 11 and 12 adopt the broken line position of FIG. 1. The links 19 and 26 and the bell crank lever 23 are such that the final movements of the rollers 11 and 12 to achieve the full size chamber position are accomplished substantially simultaneously.

From the moment a bale core with a predetermined density is formed and until a full size bale is completed, the rollers 11 and 12 together with at least some of the rollers 8 and eventually, when the full bale size is reached, all rollers 8 continuously engage the bale surface with a certain pressure which is advantageous for preventing a stalling of the bale under formation. In other words, the bale being formed is positively kept in rotational motion by a plurality of bale-forming rollers 8, 11, 12 during the entire bale formation cycle. This is advantageous for avoiding a blocking of the machine on the one hand and for obtaining a well-formed bale of high and uniform density on the other hand. Any completed bale in the bale chamber 4 is wrapped in a conventional manner and, when wrapping has been completed, the tailgate 6 is pivoted upwardly about the axis 7 for the completed bale to be discharged from the machine under gravity. Once the completed bale has cleared the machine, and with the tailgate 6 still in the raised or bale-discharge position, the rollers 11, 12 forming the second bale-forming means 9, 10 pivot downwardly under gravity about the axis of the lowermost roller 11 thus extending the actuator 28, 31 with the attendant reverse movements of the links 19 and 26 rotation of the bell crank lever 23 and relative rotation of the portions 9 and 10. Thus, the second bale-forming means 11 and 12 are returned in position ready to start the formation of a next bale but before this can be done, the tailgate 6 must be closed or lowered so that the rollers 11 and 12 adopt the position relative to the rollers 8 shown in full lines in FIG. 1 so as to re-define the start chamber 4'. The lowering or pivoting of the second bale-forming means 9, 10 under gravity when the tailgate 6 is opened and the formed bale discharged, is controlled by the restrictor 35 in the hydraulic control circuitry of the actuator 28, 31.

Looking more closely now at the operation of the control circuit of the actuator 28, 31, it will be appreciated that, as soon as bale formation commences and the force exerted by the core is such as to overcome the resistance of the hydraulic circuit as set by the relief valve 33, the piston 31 is urged into the cylinder 28 as already described. The relief valve 33 is adjustable so as to provide a variable throttle to the passage of hydraulic fluid from one end of the cylinder 28 to the other, this adjustment determining the density of the bale as already explained. As the piston 31 retracts into the cylinder 28, oil is forced from the bottom end of the cylinder through the valve 33 to the other end but, in as much as the volumes of the respective ends are unequal, there being a smaller volume at the top end due to the presence of the piston rod, then excess fluid is taken into the tank or reservoir 36. The non-return valve 34 ensures that the flow of oil from the bottom to the top of the cylinder 28 is not allowed to bypass the valve. When the piston 31 is fully retracted within the cylinder 28, which occurs when the bale chamber is at its maximum size 4, then the flow of oil in the direction mentioned ceases. When the completed bale has been discharged from the bale chamber 4 by raising the tailgate 6 and the second bale-forming means 9 and 10 pivots downwardly under gravity, as already described, the piston 31 is pulled out of the cylinder 28, whereby oil or hydraulic fluid is caused to flow from the top of the cylinder to the bottom. For a given extension of the piston 31, the volume increase at the other end of the cylinder is more because of the absence of the piston rod from that end.

Accordingly, the discrepancy in the volumes as regards oil is made up from the tank 36. This flow of oil on the extension of the actuator 28, 31 is through the by-pass of the value 33 and thus goes through the restrictor 35 which ensures that the second set of bale forming means 9, 10 does not fall quickly under gravity, which could be dangerous and, in any event, is undesirable. It will be observed that the non-return valve 34 allows the flow of oil in this direction along the bypass to the bottom end of the cylinder 28. It will also be observed that the hydraulic system is entirely self contained and therefore does not require any external connections from the tractor or other vehicle towing the baler. Furthermore, there is no separate power source by way of the normal hydraulic pump because pumping is effected, in one direction, by the force exerted by the expanding bale and, in the other direction, by gravity as the second bale-forming means 9, 10 falls when the tailgate 6 is open.

Figure 3:
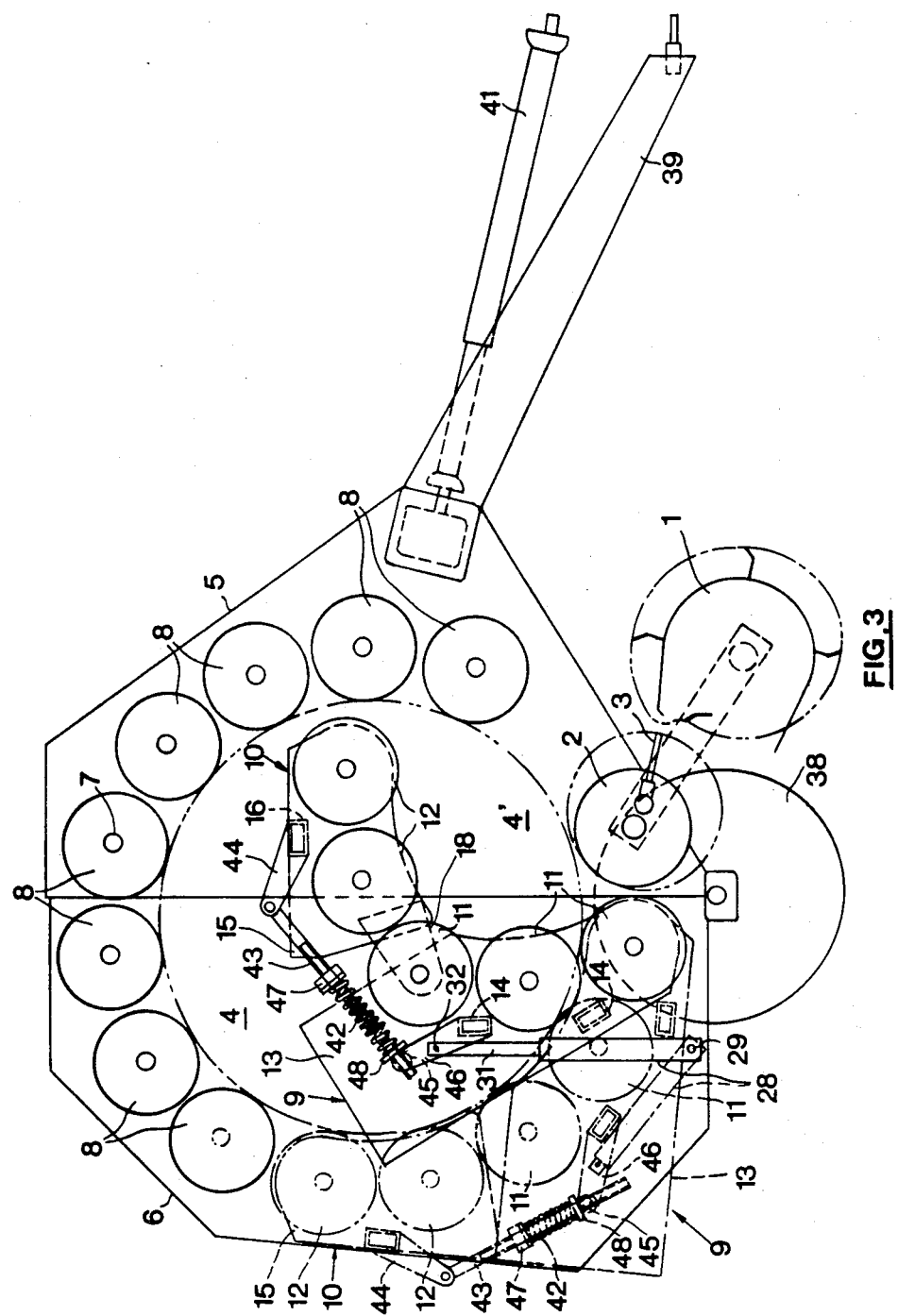
FIGS. 3 to 5 are views similar to that of FIG. 1 but showing, respectively, three alternative embodiments.

Turning now to FIG. 3, this shows basically an identical machine to that of FIGS. 1 and 2, i.e. the second set of bale-forming means has two portions which are movable relative to each other. However, the difference lies in the way in which the two portions are urged to move with respect to each other. The same reference numerals are used for like components and it will be seen that the portion 10 is pivotally attached to the other portion 9 of the second bale-forming means 11–12 and is urged to move relative thereto in an inward direction by way of a spring 42 which acts between one of the beams 14 and the beam 16 on the respective portions 9 and 10 of the second bale-forming means. The spring 42 is mounted on a threaded rod 43 which is pivotally attached, at one end, to a lug 44 attached to the beam 16 and slidingly received, at the other end, in a pivot 45 provided on one end of a lug 46 which is attached to the said one beam 14; the rod 43 further also carrying a nut 47 by which the spring force is adjustable. The spring 42 acts between the nut 47 and an abutment 48 carried by the link 46 and serves to urge the two beams 14 and 16 apart which also means that it also serves to urge the portion 10 of the second bale-forming means 11, 12 inwardly, relative to the the portion 9 thereof, as already mentioned. An identical hydraulic actuator 28, 31 together with the associated components as shown in FIGS. 1 and 2 also extends between the tailgate framework 6 and the lower portion 9 of the second bale-forming means 11, 12 and operates in precisely the same manner. Thus, the two 9, 10 portions are urged to be retained in the position in which they adopt for the initial formation of a bale, this position being shown in full lines in FIG. 3.

When bale formation commences, the core is formed in the same way as described with respect to FIGS. 1 and 2, with rotation of the core being effected in as good a manner as previously. As the force exerted by the bale being formed increases, the two portions 9 and 10 of the second bale-forming means pivot anticlockwise about the axis of the lowermost roller 11 against the resistance of the actuator 28, 31 which is now starting to contract. At the same, the portion 10 also pivots relative to the portion 9 about the axis of the uppermost roller 11 against the action of the spring 42 because the resistances offered by the actuator 28, 31 and the spring 42 are attuned to each other to guarantee these synchronized movements. Thus, the two portions 9 and 10 of the second bale-forming means move both relative to each other and together in the desired manner, and generally similarly to that of the first embodiment, until they reach the full bale position again, achieving this position generally simultaneously. In this position, the spring 42 will be compressed to its maximum. It will be appreciated that the spring arrangement will allow the rollers 12 of the second bale-forming means to pivot independently of the rollers 11 if in fact the resistances offered by the spring 42 and the actuator 28, 21 are not attuned to each other, although desirably, the two pivotal movements take place generally simultaneously as already described.

Figure 4:
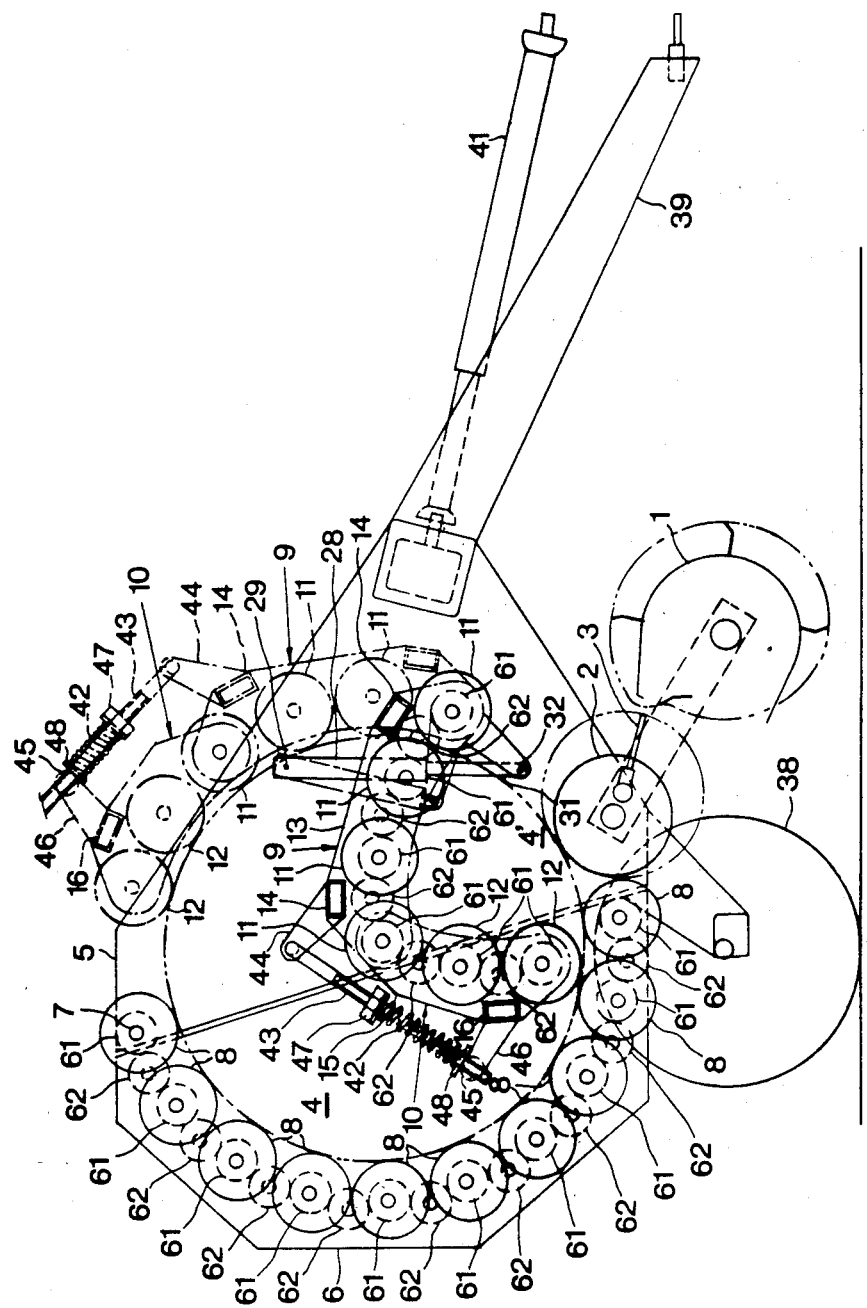

Turning now to FIG. 4, this also shows a baler having a spring 42 and rod 43 interconnecting the two portions 9 and 10 as in FIG. 3, rather than a linkage mechanism 19, 26 as in FIGS. 1 and 2. However, the difference between FIGS. 3 and 4 is that in FIG. 3 the second bale-forming means 11, 12 is provided in the tailgate 6 (as in FIG. 1), but in FIG. 4, the second means is provided in the front portion 5 of the bale chamber. The tailgate mounting or positioning of this second bale-forming means 11, 12 (as in FIGS. 1, 2 and 3) is preferred but it is feasible to adopt the arrangement of FIG. 4. This preference arises because, as the second bale-forming means of FIG. 4 begins to pivot as the bale size increases, a gap opens up at the bottom of the bale chamber 4' with the attendant risk of crop material getting into the space between the tailgate rollers and the back or top of the rollers 11, 12 of the second bale-forming means, especially since the rollers 8 at the lower end of the tailgate 6, which in part define the bale starting chamber 4', rotate in a direction so as to convey crop material rearwardly, i.e. in a direction towards and through said gap. This is, of course, undesirable to the extent that crop material would not be baled properly and furthermore, the machine would become blocked.

Turning back now to the embodiments shown in FIGS. 1, 2 respectively 3, it will be appreciated that also in these arrangements a gap opens up between the upper roller 12 of the second bale-forming means 9, 10 and the adjacent, fixedly positioned rollers 8 on the main frame portion 5. However, at this point, said rollers 12 and 8 are rotated in a direction whereby any crop material engaging these rollers is urged back into the bale chamber 4, rather than through said gap. Thus, in these combinations, the opening up of said gap does not hinder the correct bale formation.

It will be seen that in the embodiment of FIG. 4 four rollers 11 are provided rather than three as in the previous embodiments, again the same reference numerals being used for like components even when positioned differently.

The operation of the baler according to FIG. 4 and especially of the second set of bale-forming means which is movable during bale-formation, is the same as that of the embodiment of FIG. 3 and thus should not be repeated here.

It will also be seen that in FIG. 4, drive means are shown for driving the various rollers 8, 11 and 12; these drive means being in the form of first gears 61 on the roller shafts and intermediate gears 62 meshing with the first gears 61 of adjacent rollers so as to transmit driving power from one roller to the next adjacent roller. The rollers 11 of the second bale-forming means receive driving power from the PTO 41 via further drive transmission means (not shown) and the lowermost roller 11 coinciding with the pivotal mounting of the portion 9. The rollers 12, in turn, receive motive power via the upper roller 11 of the portion 9 coinciding with the pivotal mounting of the portion 10. Similarly the rollers 8 in the tailgate 6 also receive motive power via sprocket 61 coinciding with the tailgate pivot 7; this sprocket itself receiving power from the PTO 41 via further drive means (not shown). These drive train arrangements do not interfere with the pivotal mountings of respectively the portion 9 on the mainframe 5, the portion 10 on the portion 9 and the tailgate 6 on the mainframe 5 as will be readily understood. Similar drive arrangements may be used in the embodiments shown in FIGS. 1, 2 respectively 3.

Figure 5:
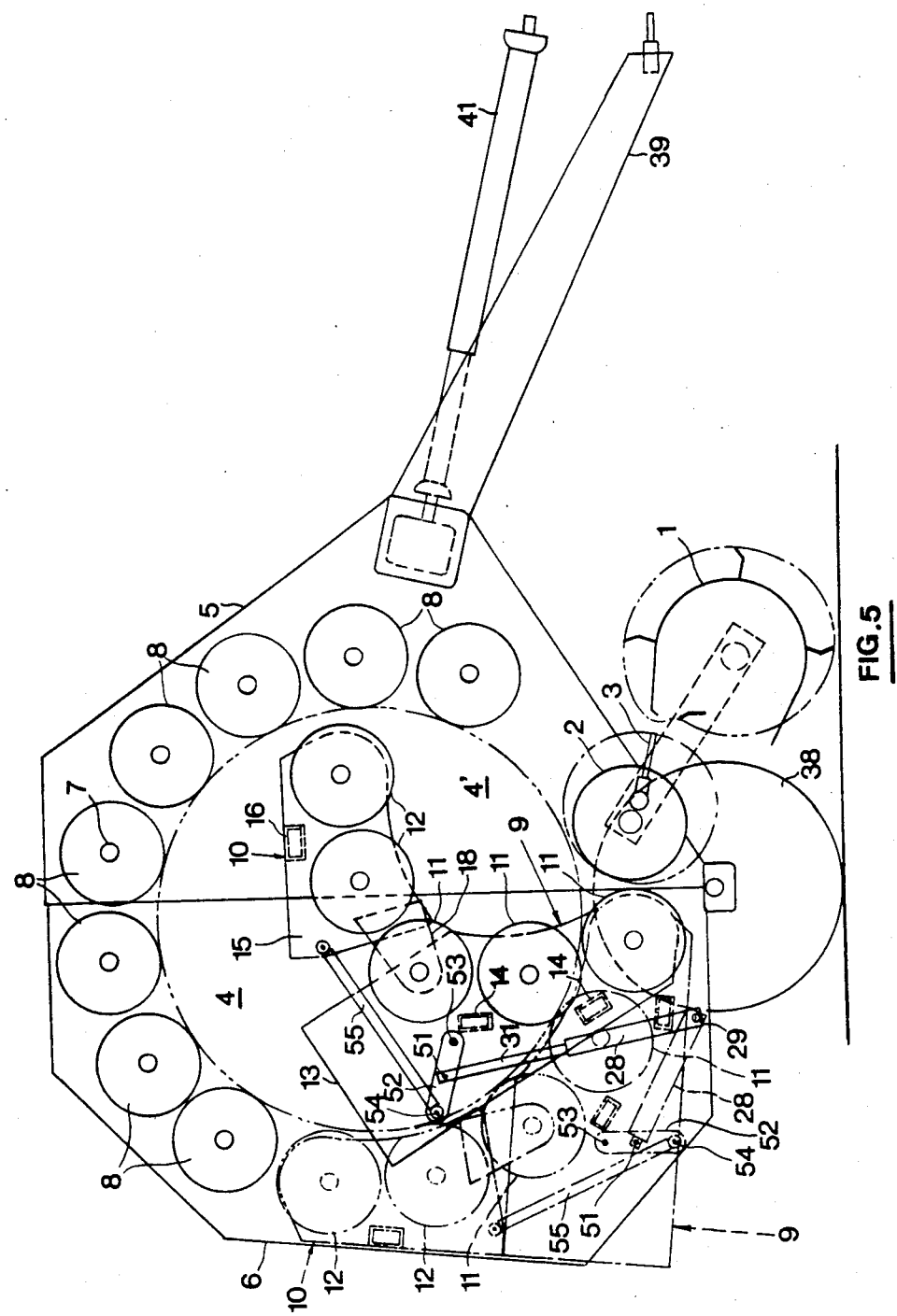

Turning now to FIG. 5, there is shown a further alternative embodiment in which the spring 42 of FIGS. 3 and 4 is dispensed with and the necessary controlled movements of the two portions 9 and 10 of the second bale-forming means are effected using a single actuator 28, 31 with a linkage mechanism. This arrangement is in fact a compromise between the embodiment of FIGS. 1 and 2 and the embodiments of FIGS. 3 and 4 in as much as in FIGS. 1 and 2 the relative movement of the two portions 9, 10 of the second bale-forming means is fully controlled by the linkage mechanism 19, 23, 26 described, whereas in the embodiments of FIGS. 3 and 4, this relative movement can be varied depending on the relative settings (resistances) of the acutator 28, 31 and spring 42. In the embodiment of FIG. 5, this controllability is more positive but it is still not a fully controlled arrangement as that of FIGS. 1 and 2. In the embodiment of FIG. 5, the same self-contained hydraulic system involving the actuator 28, 31 is utilized as in the other embodiments but the piston 31 is pivotally attached at 51 intermediate the ends of a link 52 which is pivotally attached at one end 53 to the associated sidewall 13 and pivotally attached at the other end 54 to one end of a link 55 the other end of which is pivotally attached to the associated sidewall 15. When the second bale-forming means 9, 10 is in the bale start position, the piston 31 is fully extended relative to the cylinder 28, as in the previous embodiments, and as the second bale-forming means start pivoting under the action of the increasing size of the bale, the piston 31 is forced into the cylinder as before. This movement is effected through the links 52 and 55, the portion 10 of the second bale-forming means pivoting relative to the portion 9 about the axis of the uppermost roller 11 and both portions pivoting about the axis of the lowermost roller 11, as before. Thus, the rollers 11, 12 finally adopt the full bale position as in the previous embodiments.

As already mentioned, the relative movement of the two portions 9, 10 of the second bale-forming means in the arrangement according to FIGS. 1, 2 is fully controlled, while that this is not so for the arrangements according to FIGS. 3, 4 and 5.

More specifically, in the arrangement according to FIGS. 1, 2, any given angular displacement of the lower portion 9 around the axis of the lower roller 11 necessarily results in a predetermined angular displacement of the upper portion 10 around the axis of the upper roller 11 which depends solely on the transmission ratio of the linkage means 16, 23, 26.

In contrast therewith, the upper portion 10 of the second bale-forming means in the arrangement according to FIGS. 3, 4, at least theoretically, can pivot around the axis of the upper roller 11 independently from any pivotal movement of the lower portion 9. However, in practice, both portions 9, 10 pivot generally proportionally and in a manner to continuously define, together with at least some of the rollers 8 a bale-forming chamber 4', 4 which is as close as possible to a fully cylindrical shape. Indeed, the bale being formed in this chamber is continuously rotated whereby it is generally cylindrically shaped during its formation. The hydraulic circuitry 28, 31, 33 and the spring 42 urge the respective portions 9 and 10 into engagement with the bale in the bale chamber and thus, said portions 9 and 10 indeed pivot generally proportionally in the way as described, during operation.

Turning now to the arrangement according to FIG. 5, it is conceivable that, in theory, retraction of the hydraulic cylinder does not necessarily result in a relative angular movement between the two portions 9 and 10. In other words, either only the upper portion 10 possibly could pivot around the axis of the upper roller 11 as both portions 9 and 10 could pivot in unison around the axis of the lower roller 11. However, in this case, the shape of the bale chamber would deviate substantially from the cylindrical shape of the bale being formed therein, whereby the one or the other portion would no longer contact said bale. Obviously, this would result in an unstable condition and the hydraulic system would cause the portions 9, 10 to move relative to each other until both portions contact the bale surface and thus assume, together with at least some of the rollers 8, a generally cylindrical configuration. Thus, in other words, although the relative movement of the portions 9 and 10 in the arrangement according to FIG. 5 is not fully controlled, these portions in practice nevertheless move generally following a given pattern relative to each other.

It will be seen that the present invention accomplishes good bale formation and density without machine blockage problems and that the bale density can be adjusted as required by varying the setting of the relief valve 33. The enhanced formation of the core of the bale is achieved by the ability of the two portions 9, 10 of the second bale-forming means to move relative to each other as well as in unison as the bale increases in size, the smaller angle between the two portions at the commencement of bale formation enabling a better shape of start chamber 4', as seen in cross-section, to be achieved.

It will be understood that changes to the details, materials, steps and arrangement of parts which have been described and illustrated to explain the nature of this invention will occur to and may be made by those skilled in the art upon a reading of this disclosure within the principles and scope of the invention. The foregoing description illustrates the several embodiments of the invention; however, concepts, as based upon the description may be employed in still other embodiments without departing from the scope of the invention.

As an example of the foregoing, while in all embodiments described in the foregoing description the second bale-forming means 11, 12 has only two portions which are movable relative to each other, it is very well conceivable to provide a round baler wherein the second bale-forming means has a larger number (e.g. three, four...) of relatively movable portions. This larger number of relatively movable portions is arranged in such a manner that, in the bale start position, the adjacent portions of any one pair of adjacent portions are inclined relative to each other at an angle which is smaller than the angle pertaining when the second set of bale-forming means is positioned in the full bale position. In such an arrangement, each portion thus is individually pivoted off the preceding portion, i.e. the adjacent portion closer to the common pivot axis of the second set of bale-forming means on the baler chassis or tailgate. Spring means similar to the spring means 42 shown in FIGS. 3-4 may be provided between the adjacent portions of any one pair of portions of the second bale-forming means to urge these bale-forming means towards the bale starting position and to offer the necessary resistance to the expansion of the bale chamber to form a bale of required density. The bale-forming means in each of the movable portions may be formed by one or more rollers of the type such as used in the embodiments according to FIGS. 1-5. Alternatively the bale-forming means of the outermost portion (i.e. the portion furthest away from the common pivot axis on either the bale chassis or the tailgate) may be formed by a spring loaded sheet metal plate which resiliently is urged against the surface of a bale being formed.

With these alternative arrangements, a bale starting chamber may be obtained which is even closer to a cylindrical shape than is the case with the various arrangements shown in the drawings.

Having thus described the invention, what is claimed is:

1. In a round baler with a bale chamber expandable between a bale start position and a full bale position and comprising a first bale-forming means disposed generally circumferentially around a portion of the full size bale chamber when the baler is in its bale-forming condition, and a second bale-forming means which is movable relative to the first bale-forming means between two extreme positions; said second bale-forming means being cooperable, in one extreme position, with the first bale-forming means to form the bale start chamber of reduced dimensions for starting bale formation, and, in the other extreme position, with the first bale-forming means to define a generally cylindrical bale chamber generally corresponding to a full size bale and said first and second bale-forming means being cooperable to form a round bale of crop material during movement of the second bale-forming means from the one extreme position towards the other extreme position; and an improvement comprised in that:

the second bale-forming means has at least two portions which also are movable relative to each other such that, in partially defining the bale-start chamber said portions of said second bale-forming means are inclined relative to each other at an angle which is smaller than the angle therebetween when the second bale-forming means partially defines the full size bale chamber; and the two portions of the second bale-forming means are both pivotal about a common axis with one portion further also being pivotal relative to the other portion such that said angle between the two portions increases as the bale chamber increase in size during bale formation.

2. In a round baler according to claim 1, wherein the two portions of the second set of bale-forming means are interconnected by means operable to effect said relative movement between the two portions.

3. In a round baler according to claim 2, wherein the means interconnecting the two portions of the second set of bale-forming means comprise a linkage mechanism having:

a first link pivotally connected at one end to one portion of the second bale-forming means;

a bell crank lever pivotally mounted intermediate its ends on the other portion of the second bale-forming means and pivotally connected at one of its ends to the first link, and a second link pivotally attached at one end to the bell crank lever at the other end thereof and pivotally connected at its other end to the baler; such that the angular displacement of the one portion relative to the other portion is induced by the angular displacement of the other portion around the common pivot axis.

4. In a round baler according to claim 2, wherein the means interconnecting the two portions of the second bale-forming means comprise:

a rod pivotally connected to the respective portions and being slidable with respect to one of these pivots, and a spring acting between an abutment at a fixed position relative to the rod and a further abutment associated with the pivot with respect to which the rod is slidable such that the spring urges the portions to adopt their relative positions defining the smallest included angle therebetween.

5. In a round baler according to claim 4, wherein the rod is threaded and the fixedly positioned abutment is a nut which is provided on the threaded rod; the nut being adjustable along the rod to vary the spring force acting between the two portions of the second bale-forming means.

6. In a round baler according to claim 1, wherein the two portions of the second bale-forming means have their movement about said common axis controlled by a hydraulic actuator.

7. In a round baler according to claim 6, wherein the hydraulic actuator is pivotally coupled at one end to baler and at its other end to the one portion of the second bale-forming means which itself also is pivotally mounted on the baler and to which the other portion (10) is pivotally connected.

8. In a round baler according to claim 2, wherein the means interconnecting the two portions of the second bale-forming means comprises:

a third link pivotally attached at one end to one portion, and a fourth link pivotally attached at its one end to the other portion and at its other end to the other end of the third link; the third link being connected intermediate its ends to a hydraulic actuator mounted on the baler and operable to control movement of the two portions about said common axis on the one hand and relative movement between the two portions on the other hand.

9. In a round baler according to claim 6 wherein the hydraulic actuator is coupled to a closed hydraulic circuit comprising a pressure relief valve connected between the ends of the cylinder of the actuator and which is operable to determine the resistance to movement of the second bale-forming means about said common axis.

10. In a round baler according to claim 9, wherein the pressure relief valve is adjustable in order to vary said resistance to movement and in turn to vary the density of the bale being formed in use of the baler.

11. In a round baler according to claim 8, wherein a non-return valve and a restrictor are connected in series with each other and in parallel with the pressure relief valve; the restrictor and the non-return valve being operable to control the operation of the actuator in one direction and the pressure relief valve being operable to control the operation of the actuator in the other direction.

12. In a round baler according to claim 6 wherein movement of the second bale-forming means relative to the first bale-forming means, as in use of the baler a bale is being formed, is effected by the force applied by said bale being formed on the second bale-forming means; this movement effecting contraction of the hydraulic actuator and the second bale-forming means returning under gravity to their position in which they partially define the start chamber once a formed bale has been discharged from the baler.

13. In a round baler according to claim 12, wherein the first and second bale-forming means are mounted within the baler; said baler comprising a fixed front portion and a tailgate portion pivotally mounted with respect to the front portion so as to be movable to open the bale chamber for discharging a completed bale from the baler and the second bale-forming means being mounted in the tailgate portion of the baler body.

14. In a round baler according to claim 13 wherein gravity becomes effective to return the second bale-forming means to their bale starting position when the tailgate portion is moved to the bale discharge position.

15. In a round baler according to the claim 1 wherein the first and second bale-forming means are mounted within the baler; said baler comprising a fixed front portion and a tailgate portion pivotally mounted with respect to the front portion so as to be movable to open the bale chamber for discharging a completed bale from the baler and the second bale-forming means being mounted in the front portion of the baler body.

16. In a round baler according to claim 1 wherein the first and second bale-forming means each comprise a plurality of rollers with one of the rollers of one portion of the second bale-forming means providing said common axis about which both portions are pivotal, and another roller of said one portion providing the pivot axis about which the other portion is pivotal relative to said one portion.

* * * * *